2,800,426
STABLE KHELLIN SOLUTIONS AND METHOD OF PREPARING SAME

Gerhard F. Kaellner, Hamburg, Kurt A. Mulli, Hamburg-Blankenese, and Kurt R. Uhlenbrook, Hamburg, Germany, assignors to Upha Chemische-Pharmazeutische Praeparate G. m. b. H., Hamburg, Germany No Drawing. Application June 3, 1954,
Serial No. 434,334

Claims priority, application Germany June 12, 1953

12 Claims. (Cl. 167—65)

The invention relates to khellin solutions.

The compound 2-methyl-5,8-dimethoxy furanochromone known under the name of khellin, used hereafter, is being increasingly used as an antispasmodic agent acting on the coronary vessels and suitable for the relief of other spasmic conditions. A well-known drawback of khellin is the difficulty of preparing stable aqueous solutions containing the compound in the concentration required for therapeutical purposes. The solubility of the pure khellin in water is about 1:6000. In such a diluted form, very large quantities of the aqueous solution would have to be injected to reach up to the therapeutically required dose.

As the parenteral application, particularly in the form of intramuscular and intravenous injections, is important in the therapy here involved, many attempts have been made to prepare stable solutions of the concentration desired for injections. For instance, khellin has been offered in the form of oil solutions or suspensions, which are said to be suitable for injection after heating. Also solutions in propylene glycol are known.

Various additions have been suggested to increase the solubility of khellin in water. However, most of these solubilizing additions have certain drawbacks; either their solubilizing action is not strong enough or they affect the specific therapeutic action of the khellin, or they introduce undesired side effects.

It is a principal object of the invention to provide stable aqueous khellin solutions which contain the khellin in therapeutically useful concentrations, in the presence of a solubilizing agent which does not produce any objectionable effects.

Another object of the invention is to provide stable solutions of khellin suitable for injection.

We have found that bile acids exert an excellent stabilizing effect on khellin and render it possible to prepare aqueous solutions of the desired therapeutically active concentration; in addition, such solutions satisfy substantially all the required conditions for compatibility. The water soluble salts of bile acids improve the solubility of khellin in water to an extraordinary extent and allow of obtaining without difficulties stable solutions, which contain khellin in the required concentration and can be filled into ampoules and sterilized.

Suitable solubiliizng agents are not only the water-soluble compounds of individual isolated cholic acids, such as the alkali metal and ammonium salts of dehydrocholic acid, cholic acid, desoxycholic acid, taurocholic acid, and mixtures thereof, but also alkaline extracts containing said acids directly obtained from bile. The bile acid compounds may be used alone or in combination with other solubilizing compounds, such as salicylic acid, theophyllin,p-aminobenzoic acid and/or stabilizing agents.

The khellin solutions of the invention are readily obtained by preparing aqueous solutions which contain about 5 to 25, preferably about 15 percent by weight of an alkali metal salt or ammonium salt of a bile acid and dissolving therein khellin by heating; such solutions may contain about 0.2 to 2.5 percent, preferably about 1.5 percent by weight of khellin. The temperatures and heating times depend for instance on the amount of bile acid compound present, on the physical properties of the used khellin, and on the desired khellin concentration. Most conveniently the solution is prepared on a boiling water bath.

The manner of preparing khellin solutions according to the invention is illustrated but not limited by the following examples.

Example 1

1 g. of finely powdered khellin is put into 100 ccm. of an aqueous 10% solution of the sodium salt of dehydrocholic acid. On heating, the khellin is completely dissolved. The solution is stable, can be filtered, filled into ampoules, and sterilized; it may be used for intramuscular or intravenous injections without harmful side effects.

Example 2

2 g. of finely powdered khellin are introduced in 100 cc. of an aqueous 20% solution of the sodium salt of dehydrocholic acid. Already at room temperature a substantial portion of the khellin is dissolved; the solubilization is completed by heating. The thus obtained solution has the same properties as the solution obtained according to Example 1.

Example 3

1.5 g. of finely powdered khellin are introduced in 100 cc. of a 20% aqueous solution of sodium desoxycholate, and the batch is heated on a boiling water bath until the khellin is dissolved. A clear stable solution is obtained, which after filtering, filling into ampoules and sterilizing is ready for injection.

Example 4

A 20% aqueous solution of sodium taurocholate can dissolve 7 mg. of khellin per cc. of solution. The solution can be worked up, as described in Example 3, to a stable solution which is suitable for injection.

Example 5

50 g. of Fel. tauri dep. sicc. (corresponding to the standards defined by the German Pharmacopoeia, 6th ed., supplement; cf. Dispensary of the U. S., 24th ed., p. 805) were cold extracted with 200 cc. of N-sodium hydroxide so as to obtain a solution of the sodium salts of the bile acids, which solution was clarified by centrifuging .20 cc. of the thus obtained solution dissolved on heating 300 mg. of finely powdered khellin to a stable solution.

Example 6

A 20% aqueous solution of sodium cholate dissolved khellin in a proportion of 20 mg. per cc. of solution to a stable solution.

The term "alkaline oxbile extract" is used in the present application to denote extracts obtained from ox bile in conventional manner, e. g. in the manner described in the above Example 5 of the application.

What we claim is:

1. A method of preparing stable khellin solutions which are suitable for injections comprising introducing khellin into an aqueous solution containing at least one member of the group consisting of alkali metal salts and ammonium salts of bile acids in an amount of about 5 to 25 percent by weight, and heating the solution at a temperature and for a time sufficient to dissolve about 0.2 to 2.5 percent by weight of said khellin.

2. A method as defined in claim 1 wherein the aqueous solution contains the sodium salt of dehydrocholic acid.

3. A method as defined in claim 1 wherein the aqueous solution contains the sodium salt of desoxycholic acid.

4. A method as defined in claim 1 wherein the aqueous solution contains the sodium salt of taurocholic acid.

5. A method as defined in claim 1 wherein the aqueous solution contains sodium cholate.

6. A stable aqueous khellin solution containing dissolved therein a water soluble bile acid salt and khellin in an amount exceeding 0.1 percent by weight of the solution.

7. A stable aqueous khellin solution containing dissolved therein a member of the group consisting of alkali metal salts and ammonium salts of bile acids in an amount of about 5 to 25 percent by weight and khellin in an amount of about 0.2 to 2.5 percent by weight.

8. A solution as defined in claim 7 containing the sodium salt of dehydrocholic acid.

9. A solution as defined in claim 7 containing the sodium salt of desoxycholic acid.

10. A solution as defined in claim 7 containing the sodium salt of taurocholic acid.

11. A solution as defined in claim 7 containing sodium cholate.

12. A stable aqueous khellin solution comprising a solution of about 0.2 to 2.5 g. of khellin in 100 cc. of an alkaline ox bile extract.

References Cited in the file of this patent

UNITED STATES PATENTS 2,686,145    Klatz _____ Aug. 10, 1954

OTHER REFERENCES

Mukherjee et al.: Jour. Am. Pharm. Assoc., vol. 36, Scientific Ed., 1947, page 314.

Marini-Bettolo: Anales de la Asociacion de Quimica y Farmacia del Uruguay, vol. 50 (1948), pages 3, 15, 16, 17.